United States Patent [19]
Snell et al.

[11] 3,876,607
[45] Apr. 8, 1975

[54] EPOXY COMPOSITIONS

[76] Inventors: John B. Snell; Doris A. Wambach, both of 3M Center, St. Paul, Minn. 55102

[22] Filed: July 10, 1974

[21] Appl. No.: 487,300

Related U.S. Application Data

[63] Continuation of Ser. No. 288,756, Sept. 13, 1972, which is a continuation-in-part of Ser. No. 112,438, Feb. 3, 1971, abandoned.

[52] U.S. Cl....260/37 EP; 117/126 GE; 117/161 ZB; 161/185; 260/47 EP; 260/57; 260/59; 260/830 TW
[51] Int. Cl.................. C08g 51/10; C08g 51/08
[58] Field of Search............260/37 EP, 47 EP, 59, 260/830 TW; 117/126 GE

[56] References Cited
UNITED STATES PATENTS

| | | | |
|---|---|---|---|
| 3,420,794 | 1/1969 | May et al. | 260/47 EN |
| 3,538,039 | 11/1970 | Lantz et al. | 260/47 EN X |
| 3,562,214 | 2/1971 | Kubens et al. | 260/47 EN |
| 3,631,150 | 12/1971 | Green | 260/47 EN |

OTHER PUBLICATIONS

Lee et al., Handbook of Epoxy Resins; McGraw-Hill Book Co.; 1967; pp. 21–14, 22–59, 22–60, 22–62.

*Primary Examiner*—Lewis T. Jacobs
*Attorney, Agent, or Firm*—Alexander, Sell, Steldt and DeLaHunt

[57] ABSTRACT

At high temperatures, properties such as longitudinal flexural strength and overlap shear strength of epoxy resin compositions are substantially improved by inclusion of aromatic dicyanate.

14 Claims, No Drawings

EPOXY COMPOSITIONS

BACKGROUND OF THE INVENTION

This is a continuation of application Ser. No. 288,756 filed Sept. 13, 1972, which is a continuation-in-part of our copending application Ser. No. 112,438 filed Feb. 3, 1971.

The invention relates to epoxy resin compositions having improved properties at elevated temperatures.

Partially cured epoxy resin compositions have heretofore been employed to provide self-supporting moldable sheets which are particularly useful in making aircraft structural components for moderately high temperature exposure, the compositions being cured to their final hardened state by exposure to high temperature. When combined with reinforcing fibers such as glass, boron, graphite, silicon carbide, alumina, etc., prior to cure, such compositions have provided flexible sheets or films which can be molded or laminated and thereafter cured. Curing or crosslinking agents typically incorporated in such epoxy compositions, include dicyandiamide, boron trifluoride complexes, anhydrides, imidazoles, aromatic amines, etc.

While such prior art compositions are useful for preparing molded parts and adhesives for bonding articles to be employed in moderately high temperature environments, they have not been particularly satisfactory for use at temperatures in the approximate neighborhood of 215°C. At these temperatures, properties such as longitudinal flexural strength and overlap strength are so reduced that an article cannot withstand sufficient stress to be useful. A particularly acute commercial need exists for resin compositions suitable for molding aircraft and missile structural parts which are exposed to temperatures as high as 215°C. Available epoxy resin compositions have not been found suitable for such applications.

SUMMARY

The invention provides epoxy resin compositions suitable for preparing molded articles and adhesives for bonding articles to be exposed to high temperature environments, particularly in the neighborhood of about 215°C. Articles molded from or bonded with the resins of the invention retain longitudinal flexural strength and overlap shear strength, making them particularly suited for use in aircraft and missiles exposed to high temperatures. These compositions, which are ideally suited in preparing films for lamination or for molding articles, may incorporate various filaments and supporting webs or scrims, if desired. The improved high temperature performance is achieved by incorporating dicyanate in the epoxy resin formulations.

Epoxy resins are characterized by the presence of one or more

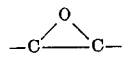

functional groups, for which persons skilled in the art identify, not only by the term epoxy, but by the terms "epoxide," "ethoxy," "ethoxyline," "glycidyl," "oxirane," and others.

Typical agents employed in curing epoxy resins are the aliphatic polyamines, polyethylene polyamines, alicyclic polyamines, organo-metallic compounds containing a silicon or boron atom, amino alkyl-substituted aromatic compounds, polymeric polyamines, imidazoles, organic acids, organic acid anhydrides, etc. A preferred curing agent is dicyandiamide.

Aromatic cyanate esters having two cyanate ester groups per molecule are also known to cure epoxy resins, e.g., see U.S. Pat. No. 3,562,214. The cured resin produced with aromatic cyanate esters, however, fails to provide a suitable resin for use at temperatures in the neighborhood of 215°C. Additionally, epoxy resins can be cured by mixed curing agents, e.g., U.S. Pat. Nos. 3,420,794, (dicyandiamide/polyamine), 3,538,039 (anhydride/imidazole) and 3,631,150 (imidazole/dicyandiamide) but the cured products of such mixed curing agents are also not suited for use at temperatures in the neighborhood of 215°C., as will be shown in the examples hereinafter.

It has now been learned that aromatic dicyanate esters employed in conjunction with a conventional epoxy resin curing agent e.g., as dicyandiamide, provides a surprising synergistic effect whereby the high temperature properties of articles and adhesives prepared from the resultant compositions are substantially and significantly improved. In accordance with the invention, the amount of aromatic dicyanate ester is sufficient to provide equivalents equal to 1 to 15% (preferably 2 to 12%) of the epoxy equivalents of the composition.

The aromatic dicyanate esters useful in the invention preferably have the formula NCO—R—OCN where R is a divalent aromatic moiety such as phenylene, or a plurality of such moieties (e.g., 2–5), which can be separated by, e.g., —O—, —C(O)—, —S—, —SO$_2$—, or divalent hydrocarbon bridging moieties, such as lower alkylene, e.g., methylene and dimethylmethylene. R is preferably a divalent radical having at least one (e.g., 15 or more) aromatic nuclei which can be linked together or bridged with ethereal oxygen atoms. Such nuclei include phenylene, diphenylene, and radicals of diphenylether, 2,2'-diphenylpropane, benzophenone, and diphenylsulfone. These aromatic nuclei may be substituted if desired, and have structures (unsubstituted) shown as follows:

TABLE I

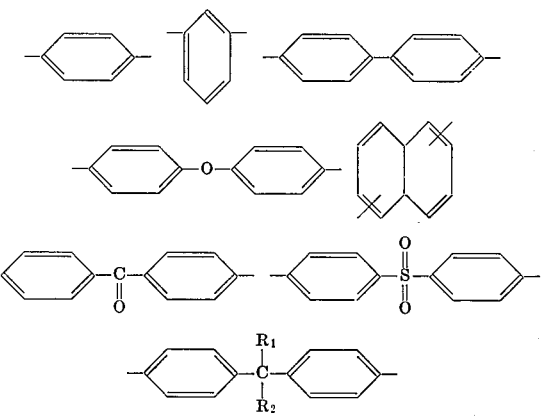

wherein R$_1$ is H or CH$_3$, and R$_2$ is H, CH$_3$, C$_2$H$_5$ or C$_3$H$_7$. Representative and preferred cyanophenyl-terminated polyarylene ethers coming within the scope of general formula NCO—R—OCN include those shown in Table II.

TABLE II

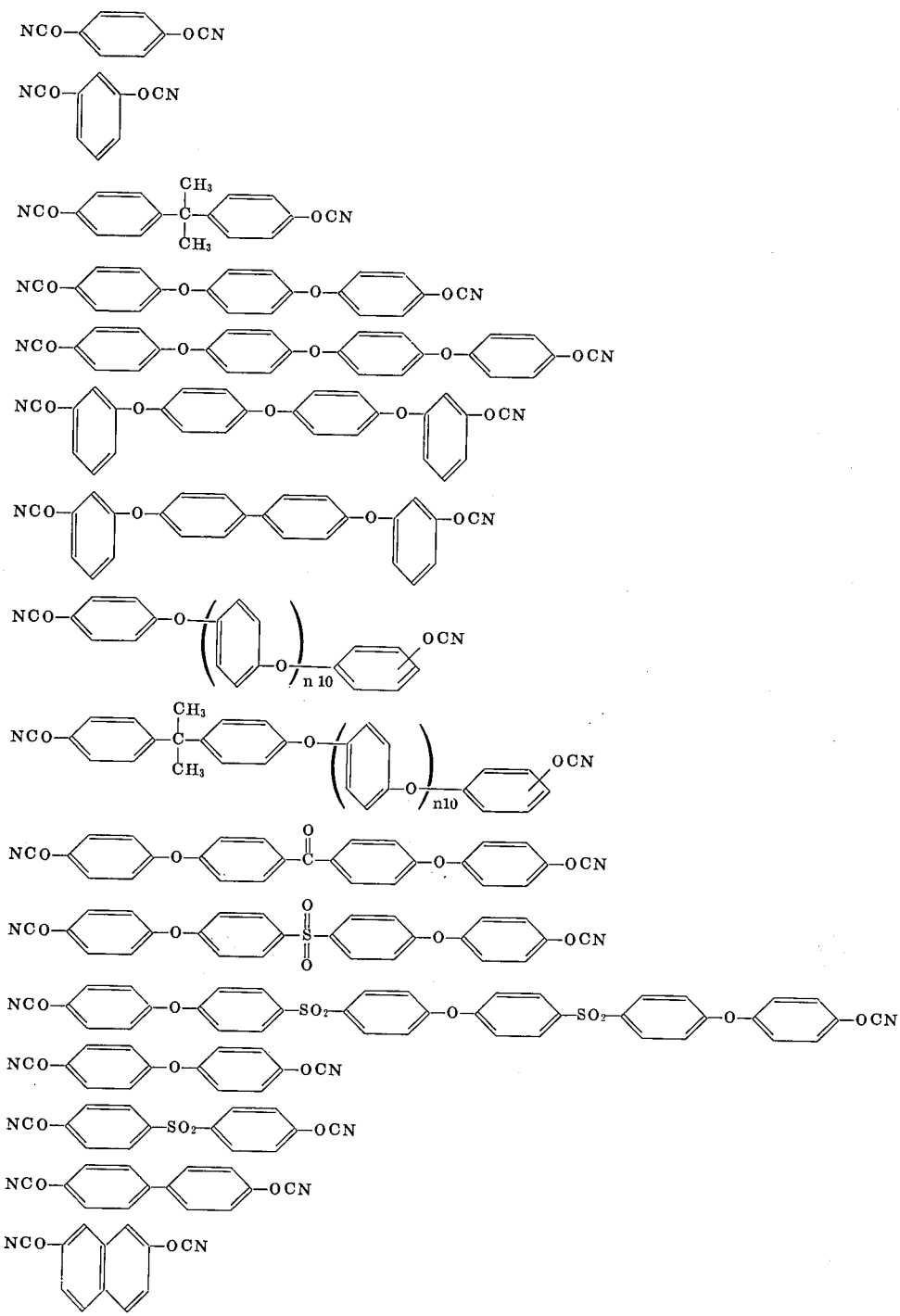

The dicyanates useful in the invention may be prepared by reacting dihydroxy polyarylene precursors with cyanogen halide in the presence of a base; U.S. Pat. No. 3,219,670 discloses representative hydroxy precursors. Cyanation of these precursors is generally carried out by reacting them with a stoichiometric amount of cyanogen halide. Because of the exothermic reaction, possible side reactions, and the volatility of the cyanogen halide, low temperatures below the boiling points of the reactants are maintained during cyanation. Generally, temperatures in the range of −40° to 40°C., preferably −20° to 0°C., are used and the reaction is carried out in inert liquid organic solvent such as acetone, ether, tetrahydrofuran, aromatic hydrocarbons, e.g., benzene, toluene, and xylene, and halogenated aliphatic or aromatic hydrocarbons. The cyanation reaction is carried out in the presence of a base such as a tertiary amine like triethylamine or an alkali metal hydroxide like sodium hydroxide, the amount of base used being sufficient to neutralize the hydrogen halide produced in the reaction (see German Pat. No. 1,190,184). Preferably, the addition rate of the base is adjusted during cyanation so that an excess of cyanogen halide is present.

Cyanogen halides which may be used include cyanogen chloride and cyanogen bromide, both being well known compounds which are commercially available or which can be prepared by well known methods. Stoichiometrically, one mole of cyanogen halide is reacted with one equivalent of hydroxyl group in the hydroxy polyarylene reactant; however, up to 10% excess cyanogen halide is preferred.

After cyanation is complete, the cyanate product is recovered from the reaction mixture by any suitable recovery procedure, such as precipitation, extraction, distillation, recrystallization, etc. Preferably, the product is recovered by mixing the reaction mixture with water-immiscible organic solvents in which the cyanate is soluble, such as methylene chloride, chloroform or benzene. The resulting solvent mixture is then poured into ice water. The non-aqueous phase containing the cyanate is separated from the aqueous phase containing the neutralized halide, for example, by decanting, and can be dried, for example, over anhydrous magnesium sulfate and filtered. The solvent can then be removed from the cyanate by stripping, for example under vacuum at room temperature.

Other aromatic dicyanates which can be used include those disclosed in German Pat. Nos. 1,190,184 and 1,195,764, Angew. Chemie, 76 303(1964) and Acta. Chem. Scand., 18 826(1964).

In general, the novel epoxy compositions of the invention are utilized to prepare articles and adhesives by thoroughly mixing the epoxy resin, curing agent, and aromatic dicyanate with or without solvents. Various fibers may be incorporated in the composition and the composition poured into molds and cured. Alternatively, scrim cloths or webs may be saturated with the composition to provide an adhesive sheet. The compositions may also be coated on a release liner for use in molding or laminating purposes and/or partially cured to a B-stage for easier handling. If desired, several layers of the composition may be superimposed and laminated. To obtain the final article or adhesive bond, the composition is exposed to heat and cured or cross-linked.

The improvement observed in the high temperature properties of articles or adhesives made from the compositions of the invention are readily ascertained by standard ASTM or military specification tests of such properties as longitudinal and transverse flexural strength, beam shear strength, tensile strength, and overlap shear strength tests. The particular tests utilized vary depending upon whether a reinforced plastic laminate, a resin coating, or adhesive bond is being prepared.

The following examples, in which all parts are by weight unless otherwise indicated, further illustrate the invention without limiting the scope thereof.

EXAMPLES 1–12

These examples illustrate preparation of reinforced plastic articles and demonstrate the improvement in longitudinal flexural strength obtained at elevated temperatures by incorporating dicyanate.

The components shown in the Examples in Table III were combined in methyl ethyl ketone to provide a coatable viscosity, made into a resin film by knife coating and the solvent removed. The components of each Example were also coated on glass fabric by knife coating techniques. A layer of parallel continuous 4 mil boron monofilaments were placed (210 per inch width) between the resin film and the glass fabric supported resin film and laminated to prepare a moldable flexible reinforced sheet product.

Test panels were prepared by superimposing 15 plies of 3 × 10 inch sheets of the previously prepared laminates (for each Example) with the fibers aligned parallel to the longer dimension. Each such assembly was inserted in a press (85 psi) at room temperature, the temperature gradually raised to 175°C. at a rate of 6° per minute and then held at 195°C. for 1 hour. The panels were removed from the press and post cured in an air-circulating oven for 1 hour at 175°C., 1 hour at 190°C., 1 hour at 205°C., and 2 hours at 215°C.

Each of the laminated samples was then cut into test specimens (½ × 3 inches) and the longitudinal flexural strength determined in accordance with ASTM Test Procedure D790-66. The test results obtained are shown in Table III, a marked improvement over the control lacking aromatic dicyanate and controls containing additives other than aromatic dicyanate being observed at the 215°C. test conditions.

TABLE III

| Example | EPOXY RESIN AMOUNT, GMS. | | PRIMARY CURING AGENT | | ADDITIVE CURING AGENT | | Panel thickness, mils | Flexural strength psi at 215°C. |
|---|---|---|---|---|---|---|---|---|
| | Solid epoxidized cresol novolac[1], m.p. 80°C., eq. wt. 230 | Triglycidyl p-amino phenol[2], eq. wt. 97–101 | Type | % by equivalents | Type | % by equivalents | | |
| 1 | 50.6 | 43.4 | dicyandiamide | 43.7 | — | — | 78 | 140,000 |
| 2 | 50.6 | 43.4 | " | 65.6 | — | — | " | 142,000 |
| 3 | 100 | 72.5 | " | 53.4 | aromatic[3] dicyanate | — | 67–70 | 149,000 |
| 4 | 48.5 | 41.7 | " | 59.3 | " | 2.2 | 78 | 169,000 |
| 5 | 46.4 | 39.8 | " | 70.0 | " | 6.0 | " | 172,000 |
| 6 | 47.5 | 40.8 | " | 44.3 | " | 7.0 | " | 175,000 |
| 7 | 100 | 72.5 | " | 53.4 | " | 7.4 | 70–73 | 195,000 |
| 8 | 44.6 | 38.2 | " | 59.5 | " | 12.4 | 78 | 181,000 |
| 9 | 44.5 | 38.2 | " | 44.0 | " | 15.6 | " | 174,000 |
| 10 | 100 | 72.5 | " | 53.4 | isophthalodihydrazide | 7.3 | 72–73 | 132,000 |
| 11 | " | " | " | 53.4 | methylene dianiline | 7.4 | 71–72 | 159,000 |
| 12 | " | " | " | 53.4 | hexahydrophthalic anhydride | 8.6 | 78–80 | 125,000 |

[1]Commercially available from the Ciba Chemical Company under the trade designation "ECN 1280".
[2]Commercially available from the Union Carbide Corporation under the trade designation "ERL-0510".
[3]Bisphenol-A dicyanate "B"-staged by heating at 200°F. until a viscosity of 500 cps is obtained.

EXAMPLES 13-17

These examples illustrate use of the compositions of the invention as adhesives and the improvement in overlap shear strength obtained at elevated temperatures.

The compositions listed in Table IV were prepared in sufficient methyl ethyl ketone solvent to provide a coatable viscosity, coated on a glass scrim cloth by normal knife coating techniques, and dried at 80°C. for about 45 minutes to remove the solvent. The scrim cloth served as a carrier web to provide a self-supporting adhesive sheet.

Aluminum panels (4 × 7 × 0.063 inches) were vapor degreased with perchloroethylene, immersed in an alkaline etch bath for 10 minutes at 90°C., rinsed with tap water, etched in a sodium dichromate-sulfuric acid bath, rinsed in tap water, and dried at 65°C.

The adhesive sheet was applied to one face of a first aluminum panel and a second aluminum panel positioned thereover so that it overlapped the first panel by one-half inch. The adhesive was then cured while holding the assembly in a press at 50 psi and 175°C. for 1 hour, and post cured by heating at 175°C. for 1 hour, 190°C. for 1 hour, 205°C. for 1 hour and 215°C. for 2 hours, after which the assembly was removed and cooled. The assembly panels were then cut into 1-inch wide strips extending at 90° to the overlap and the overlap shear value (psi) determined by means of an "Instron" tensile tester, with the tensile loading being applied at a rate of about 1,300 psi per minute until the bond failed. The sample specimens tested at elevated temperatures were conditioned at the test environment for not less than 15 minutes nor more than 30 minutes prior to testing. The overlap shear strength data obtained are shown in Table IV, significant improvement over the control being noted at the elevated temperatures when dicyanate is included in the resin formulation.

As can be seen in the tables, cured compositions containing aromatic dicyanate additive in the range of 2.2 to 15.6% (by equivalent), as well as conventional curing agent, have improved flexural and overlap shear strengths. The improvement at 215°C. in each of these values is consistently at least 20% more than compositions containing only conventional dicyanamide. This improvement is indicative of the improved heat resistance of compositions made according to the invention. When the term "improved heat resistance" is used in the claims, it conotes that compositions as claimed have flexural strengths and overlap shear strengths (when prepared in test samples as described above) having an improvement of at least 20% at the temperature indicated.

We claim:

1. A curable composition comprising an epoxy resin mixture consisting essentially of epoxidized cresol novolac resin and epoxidized aminophenol resin and an effective amount of a mixed curing agent therefor consisting essentially of
   A. from 1-15% of the epoxy equivalents of aromatic dicyanate selected from a group consisting of bisphenol A dicyanate and bisphenol B dicyanate and
   B. an effective amount of dicyandiamide curing agent sufficient to cure said resin to a hard cured product, said mixed curing agent being capable of curing said resin to a hard cured product which has heat resistance properties appreciably improved in the neighborhood of 215°C. over those heat resistance properties of the cured product produced with (B) alone and over those heat resistance properties of a cured product produced by sufficient (A) alone to cure said resin to a hard cured product.

2. The composition of claim 1 additionally containing fibers.

3. The composition of claim 2 wherein said fibers are boron.

4. A molded article comprising the reaction product of an epoxy resin mixture consisting essentially of epoxidized cresol novolac resin and epoxidized aminophenol resin and an effective amount of a mixed curing agent therefor, said curing agent consisting essentially of
   A. from 1-15% of the epoxy equivalents of aromatic dicyanate selected from a group consisting of bisphenol A dicyanate and bisphenol B dicyanate and
   B. an effective amount of dicyandiamide curing agent sufficient to cure said resin to a hard cured product, said mixed curing agent being capable of curing said resin to a hard cured product which has heat resistance properties appreciably improved in the neighborhood of 215°C. over those heat resistance properties of the cured product produced with (B) alone and over those heat resistance properties of a cured product produced by sufficient (A) alone to cure said resin to a hard cured product.

5. The molded article of claim 4 wherein said compo-

TABLE IV

| Ex. | Epoxy Resin Amount, Gms. | | Primary Curing Agent | | Additive Curing Agent | | Overlap Shear Strength (psi) | | | | | |
|---|---|---|---|---|---|---|---|---|---|---|---|---|
| | Solid epoxidized cresol novolac[1], m.p. 80°C., eq. wt. 230 | Triglycidyl p-amino phenol[2], eq. wt. 97-101 | Type | % by equivalents | Type | % by equivalents | Room temp | 120°C. | 150°C. | 175°C. | 190°C. | 215°C |
| 13 | 40 | 34.8 | dicyandiamide | 65.8 | — | — | 2,410 | 2,710 | 2,530 | 2,210 | 1,910 | 1,210 |
| 14 | 47.7 | 41.7 | '' | 65.6 | aromatic dicyanate[3] | 2.3 | 2,390 | 2,710 | 2,660 | 2,420 | 2,160 | 1,490 |
| 15 | 46.7 | 40.8 | '' | 66.2 | '' | 4.7 | 2,310 | 2,820 | 2,710 | 2,540 | 2,170 | 1,550 |
| 16 | 45.7 | 40.0 | '' | 66.0 | '' | 7.2 | 2,280 | 2,830 | 2,740 | 2,680 | 2,430 | 1,630 |
| 17 | 44.7 | 39.0 | '' | 66.2 | '' | 9.8 | 2,380 | 2,840 | 2,840 | 2,590 | 2,330 | 1,540 |

[1]Commercially available from the Ciba Chemical Company under the trade designation "ECN 1280".
[2]Commercially available from the Union Carbide Corporation under the trade designation "ERL-0510".
[3]Bisphenol-A dicyanate "B"-staged by heating at 200°F. until a viscosity of 500 cps is obtained.

sition additionally contains fibers.

6. The composition of claim 5 wherein said fibers are boron.

7. A self-supporting laminating adhesive sheet comprising supporting fabric and the reaction product of an epoxy resin mixture consisting essentially of epoxidized cresol novolac resin and epoxidized aminophenol resin and an effective amount of a mixed curing agent therefor, said curing agent consisting essentially of
   A. from 1–15% of the epoxy equivalents of aromatic dicyanate selected from a group consisting of bisphenol A dicyanate and bisphenol B dicyanate and
   B. an effective amount of dicyandiamide curing agent sufficient to cure said resin to a hard cured product,
said mixed curing agent being capable of curing said resin to a hard cured product which has heat resistance properties appreciably improved in the neighborhood of 215°C. over those heat resistance properties of the cured product produced with (B) alone and over those heat resistance properties of a cured product produced by sufficient (A) alone to cure said resin to a hard cured product.

8. The composition of claim 7 wherein said fabric is a glass scrim cloth.

9. A flexible sheet material comprising a homogeneous curable epoxy resin composition and fibers, said curable composition comprising an epoxy resin mixture consisting essentially of epoxidized cresol novolac resin and epoxidized aminophenol resin and an effective amount of a mixed curing agent therefor consisting essentially of
   A. from 1–15% of the epoxy equivalents of aromatic dicyanate selected from a group consisting of bisphenol A dicyanate and bisphenol B dicyanate and
   B. an effective amount of dicyandiamide curing agent sufficient to cure said resin to a hard cured product,
said mixed curing agent being capable of curing said resin to a hard cured product which has heat resistance properties appreciably improved in the neighborhood of 215°C. over those heat resistance properties of the cured product produced with (B) alone and over those heat resistance properties of a cured product produced by sufficient (A) alone to cure said resin to a hard cured product.

10. The sheet of claim 9 wherein said fibers are boron.

11. The sheet of claim 10 additionally containing a layer of glass cloth.

12. The sheet of claim 9 wherein said fibers comprise a glass cloth.

13. The sheet of claim 9 wherein said fibers are glass.

14. The sheet of claim 9 wherein said fibers are graphite.

* * * * *